(12) United States Patent
Major et al.

(10) Patent No.: US 12,227,215 B2
(45) Date of Patent: Feb. 18, 2025

(54) MATERIAL HANDLING DEVICE WITH INTEGRATED HINGES

(71) Applicant: Formall, Inc., Clinton, TN (US)

(72) Inventors: Daniel Major, Clinton, TN (US); Christopher Krohn, Clinton, TN (US)

(73) Assignee: Formall, Inc., Clinton, TN (US)

( * ) Notice: Subject to any disclaimer, the term of this patent is extended or adjusted under 35 U.S.C. 154(b) by 723 days.

(21) Appl. No.: 17/444,550

(22) Filed: Aug. 5, 2021

(65) Prior Publication Data
US 2022/0041198 A1 Feb. 10, 2022

Related U.S. Application Data

(60) Provisional application No. 63/061,607, filed on Aug. 5, 2020.

(51) Int. Cl.
*B62B 3/02* (2006.01)

(52) U.S. Cl.
CPC .................................. *B62B 3/025* (2013.01)

(58) Field of Classification Search
CPC ............ B62B 3/02; B62B 3/002; B62B 3/025
See application file for complete search history.

(56) References Cited

U.S. PATENT DOCUMENTS

| | | | | | |
|---|---|---|---|---|---|
| 3,191,959 | A * | 6/1965 | Heimbruch | ............. | B62B 3/025 |
| | | | | | 280/33.991 |
| 3,840,242 | A * | 10/1974 | Craig, Sr. | ............... | B62B 3/186 |
| | | | | | 280/33.996 |
| 3,840,243 | A * | 10/1974 | Rheinhart | ................ | B62B 3/18 |
| | | | | | 280/33.996 |
| 3,920,258 | A * | 11/1975 | Lundstrom | ............. | B62B 3/186 |
| | | | | | 280/33.996 |
| 3,971,568 | A * | 7/1976 | Wright | .................... | B62B 3/184 |
| | | | | | 280/33.996 |
| 3,977,689 | A * | 8/1976 | Rosa | ....................... | B62B 3/186 |
| | | | | | 280/33.996 |
| 3,981,510 | A * | 9/1976 | Gustafsson | ............. | B62B 3/186 |
| | | | | | 280/33.996 |
| 4,199,164 | A * | 4/1980 | Sjoblom | ................. | B62B 3/186 |
| | | | | | 220/255 |
| 4,346,906 | A * | 8/1982 | Thorpe | ................... | B62B 3/186 |
| | | | | | 280/33.996 |
| 4,678,090 | A * | 7/1987 | Ross | ....................... | B62B 3/025 |
| | | | | | 280/33.996 |
| 5,765,702 | A * | 6/1998 | Bustos | .................... | A47F 5/137 |
| | | | | | 280/47.21 |
| 9,821,828 | B2 * | 11/2017 | Kahler | ...................... | B62B 3/10 |
| 9,901,169 | B1 * | 2/2018 | Schenker | ............. | A47B 96/021 |

(Continued)

*Primary Examiner* — Katy M Ebner
(74) *Attorney, Agent, or Firm* — Robinson IP Law, PLLC

(57) ABSTRACT

A cart includes: a side frame portion extending across a width of the cart; a first end portion pivotally mounted on a first end of the side frame portion; a second end portion pivotally mounted on a second end of the side frame portion; a shelf movably mounted on one of the side frame portion, first end portion, and second end portion. In an unfolded configuration, the first end portion and the second end portion are unfolded relative to the side frame portion and the shelf is substantially horizontal for locating items thereon. In a folded configuration, one or both of the first end portion and the second end portion is folded against the side frame portion.

6 Claims, 14 Drawing Sheets

(56) References Cited

U.S. PATENT DOCUMENTS

| | | | |
|---|---|---|---|
| 10,182,650 B1* | 1/2019 | Schenker | A47B 43/00 |
| 11,453,425 B1* | 9/2022 | Maman | B62B 3/005 |
| 11,767,047 B2* | 9/2023 | Pajevic | B62B 3/003 |
| | | | 280/651 |
| 11,891,100 B2* | 2/2024 | Park | B62B 3/025 |
| 2005/0139131 A1* | 6/2005 | Chen | A47B 43/00 |
| | | | 108/177 |
| 2016/0347340 A1* | 12/2016 | Kahler | A47B 81/00 |
| 2018/0037245 A1* | 2/2018 | Kahler | B62B 3/025 |

* cited by examiner

MATERIAL HANDLING DEVICE WITH INTEGRATED HINGES

CROSS-REFERENCE TO RELATED APPLICATION

This application claims priority to U.S. Provisional Patent Application Ser. No. 63/061,607 for a "Material Handling Device With Integrated Hinges" filed on Aug. 5, 2020, the contents of which are incorporated herein by reference in its entirety.

FIELD

This disclosure relates to the field of material handling equipment or carts. More particularly, this disclosure relates to a folding device having hinges integrated thereon.

BACKGROUND

Carts or hand trucks may be used to carry or transport items, such as in a warehouse or back area of an establishment where inventory is stored. These carts are typically adapted to carry multiple items and may arranged in various configurations for transporting various items. For example, a cart or hand truck may include various shelves located thereon for transporting items on the shelves.

When not in use, it may be desirable to fold the cart to prevent the cart from occupying significant space that may be used for other items. Existing carts may include multiple hinges along the cart to allow the cart to fold. These hinges may be placed between portions of the cart, such as a back and side portion of the cart, thereby placing significant stress on the hinges and compromising an overall strength or stability of the cart. Further, adding hinges to a cart may add complexity and increase a cost of the cart.

What is needed, therefore, is a folding cart having integrated hinges that allow the cart to fold.

SUMMARY

The above and other needs are met by a folding cart having integrated hinges that allow the cart to fold. In a first aspect, a cart includes: a side frame portion extending across a width of the cart; a first end portion pivotally mounted on a first end of the side frame portion; a second end portion pivotally mounted on a second end of the side frame portion; and a shelf movably mounted on one of the side frame portion, first end portion, and second end portion. In an unfolded configuration, the first end portion and the second end portion are unfolded relative to the side frame portion and the shelf is substantially horizontal for locating items thereon; and in a folded configuration, one or both of the first end portion and the second end portion is folded against the side frame portion.

In one embodiment, the first side frame portion further includes one or more vertical supports extending upwardly therefrom and one or more horizontal members extending across the side frame portion and supported on the one or more vertical supports; the first end portion further includes one or more vertical supports extending upwardly therefrom and one or more horizontal members and supported on the one or more horizontal members; and the second end portion further includes one or more vertical supports extending upwardly therefrom and one or more horizontal members.

In another embodiment, the cart further includes a first hinge bar. The first hinge bar is located through at least a portion of the one or more of the horizontal members of the side frame portion and the one or more horizontal members of the first end portion such that the first end portion pivots relative to the side portion about the hinge bar.

In yet another embodiment, the shelf is pivotally mounted to the side frame portion and pivots between a folded position and a deployed position. In one embodiment, the shelf further comprising a latch for securing the shelf in the folded position and in the deployed position.

In another embodiment, the first end portion and the second end portion including a support mounted on distal ends thereof, wherein the shelf is supported on the support of the first end portion and the support of the second end portion in an unfolded position.

In a second aspect, a cart includes: a side frame portion extending across a width of the cart, the side frame portion including one or more vertical supports extending upwardly therefrom and one or more horizontal members extending across the side frame portion and supported on the one or more vertical supports; a first end portion pivotally mounted on a first end of the side frame portion, the first end portion including one or more vertical supports extending upwardly therefrom and one or more horizontal members supported on the one or more vertical supports; a second end portion pivotally mounted on a second end of the side frame portion, the second end portion including one or more vertical supports extending upwardly therefrom and one or more horizontal members supported on the one or more vertical supports; and a shelf pivotally mounted on the side frame portion, first end portion, and second end portion. In an unfolded configuration, the first end portion and the second end portion are unfolded relative to the side frame portion and the shelf is substantially horizontal for locating items thereon. In a folded configuration, one or both of the first end portion and the second end portion is folded against the side frame portion.

In a third aspect, a cart includes: a side frame portion extending across a width of the cart, the side frame portion including one or more vertical supports extending upwardly therefrom and one or more horizontal members extending across the side frame portion and supported on the one or more vertical supports; a first end portion pivotally mounted on a first end of the side frame portion, the first end portion including one or more vertical supports extending upwardly therefrom and one or more horizontal members supported on the one or more vertical supports; a second end portion pivotally mounted on a second end of the side frame portion, the second end portion including one or more vertical supports extending upwardly therefrom and one or more horizontal members supported on the one or more vertical supports; and a shelf pivotally mounted on one of the side frame portion. In an unfolded configuration, the first end portion and the second end portion are unfolded relative to the side frame portion and the shelf is substantially horizontal for locating items thereon. In a folded configuration, one or both of the first end portion and the second end portion is folded against the side frame portion.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
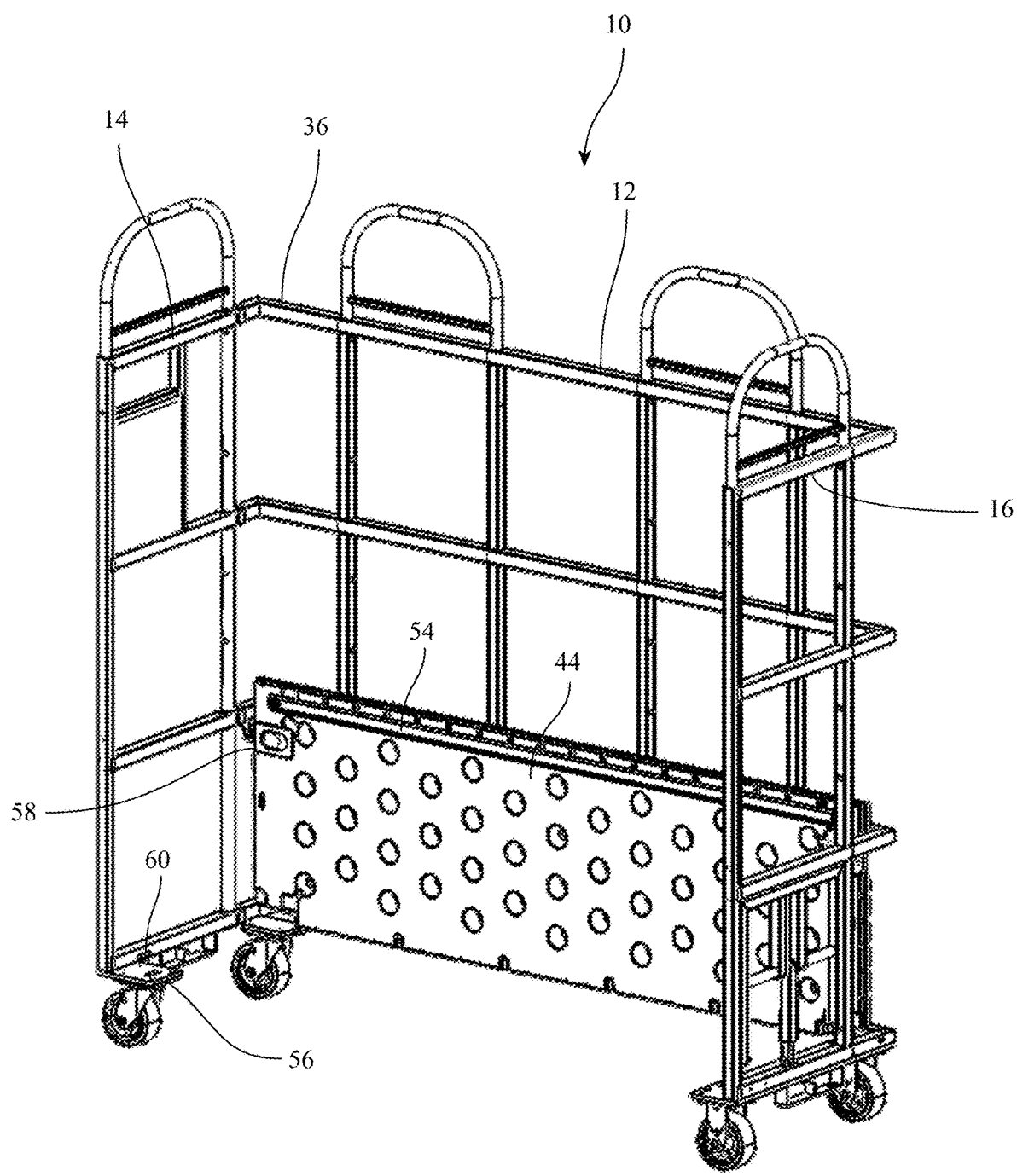
FIG. 1 shows a cart in a partially folded configuration according to one embodiment of the present disclosure.

FIG. 1 shows a basic embodiment of a material handling device such as a cart 10 that is adapted to fold, such as along sides of the cart 10. The cart 10 may include a side frame portion 12, a first end portion 14, and a second end portion 16. At least one of the first side portion 14 and the second side portion 16 may be foldable relative to the side frame portion 12, such as when the cart 10 is stored. The cart 10 may further include at least one shelf 18 secured to one of the side frame portion 12, first end portion 14, and second end portion 16. The at least one shelf 18 may be folded relative to the side frame portion 12, first end portion 14, and second end portion 16. Embodiments of the cart 10 described herein advantageously allow at least one of the first end portion 14 and the second end portion 16 to fold relative to the side frame portion 12 to reduce a size of the cart 12 during storage without substantially compromising a strength or stability of the cart 10.

Figure 2:
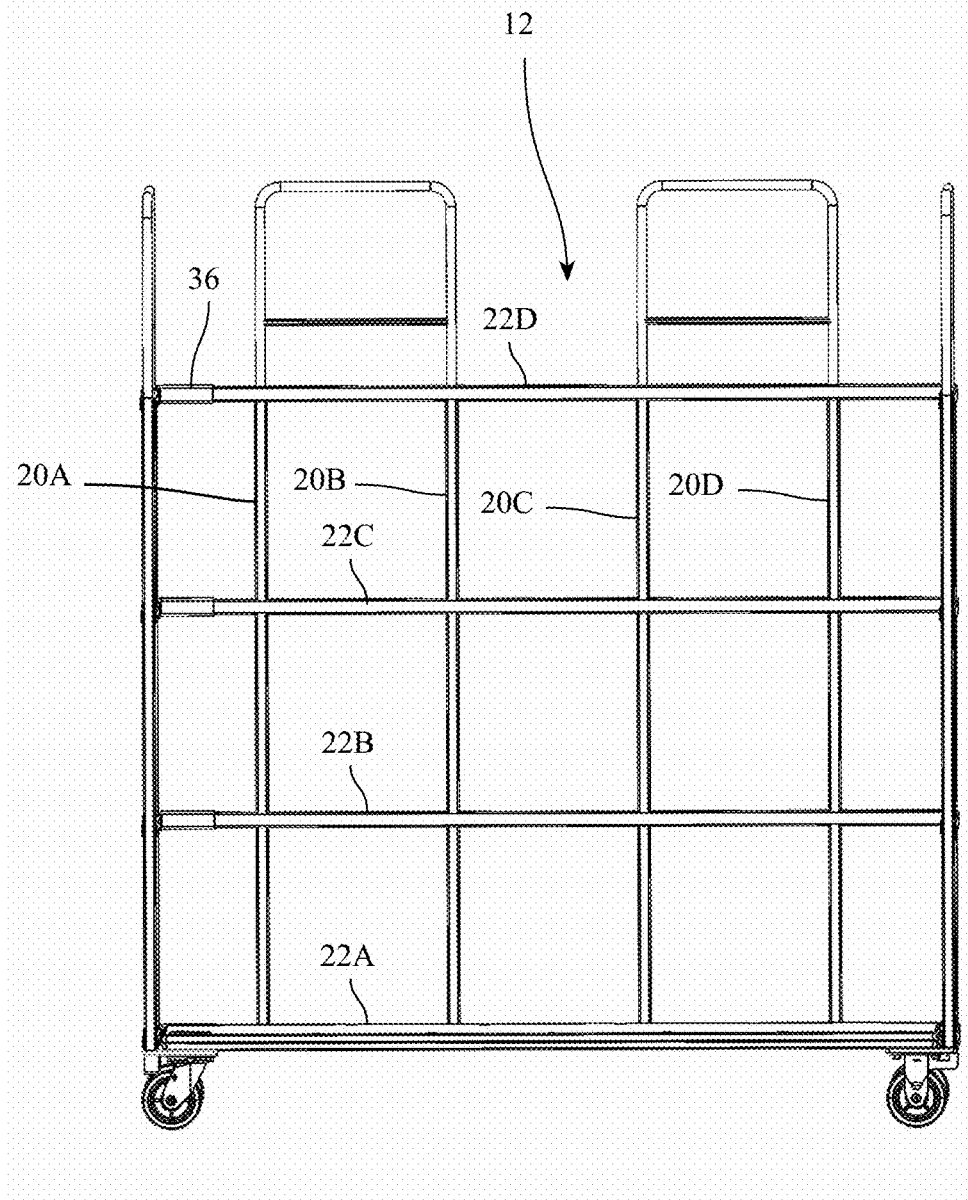
FIG. 2 shows a front view of a cart according to one embodiment of the present disclosure.

Referring to FIG. 2, the side frame portion 12 may include one or more vertical members 20A-20D extending from a first end at a bottom of the side frame portion 12 to a second end towards a top of the side frame portion 12. The side frame portion 12 further may include one or more horizontal members 22A-22D extending substantially across a width of the side frame portion 12. The one or more horizontal members 22A-22D are preferably secured to the one or more vertical members 20A-20D, such as by welding the one or more horizontal members 22A-22D to the one or more vertical members 20A-20D at points where the members intersect. The one or more vertical members 20A-20D and one or more horizontal members 22A-22D are preferably elongate and formed having rectangular cross-sectional areas, such as by forming the one or more vertical members 20A-20D and one or more horizontal members 22A-22D from rectangular tubing. However, it is also understood that the one or more vertical members 20A-20D and one or more horizontal members 22A-22D may be formed having other suitable shapes, such as round tubing. Further, although the figures illustrate use of the one or more vertical members 20A-20D and one or more horizontal members 22A-22D, an arrangement and number of the one or more vertical members 20A-20D and one or more horizontal members 22A-22D may vary.

Figure 3:
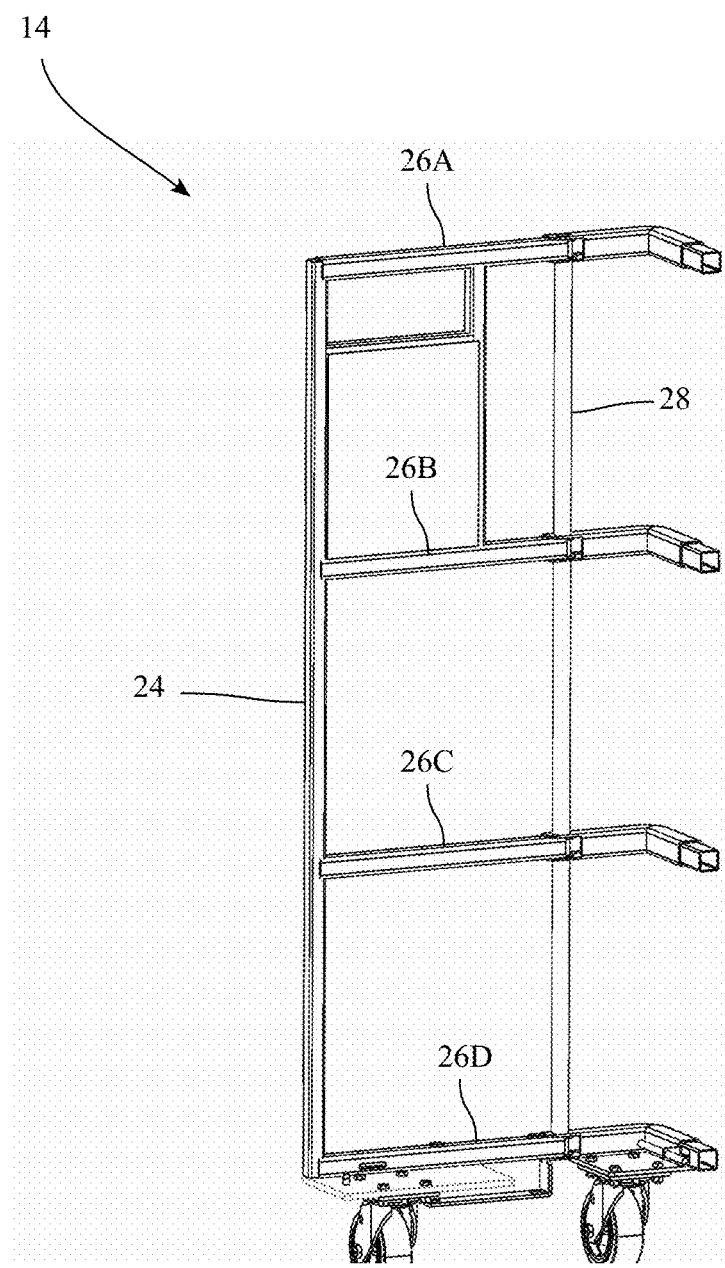
FIG. 3 shows a perspective view of a first end portion of a cart according to one embodiment of the present disclosure.

Referring now to FIG. 3, the first end portion 14 may include at least one elongate vertical member 24 and one or more horizontal members 26A-26D. The one or more horizontal members 26A-26D are preferably secured to the at least one vertical members 24, such as by welding the one or more horizontal members 26A-26D to the at least one vertical member 24 at points where the members intersect. The at least one vertical member 24 and one or more horizontal members 26A-26D are preferably elongate and formed having rectangular cross-sectional areas, such as by forming the at least one vertical member 24 and one or more horizontal members 26A-26D from rectangular tubing. However, it is also understood that the at least one vertical member 24 and one or more horizontal members 26A-26D may be formed having other suitable shapes, such as round tubing. Further, although the figures illustrate use of the at least one vertical member 24 and one or more horizontal members 26A-26D, an arrangement and number of the at least one vertical member 24 and one or more horizontal members 26A-26D may vary.

Figure 4:
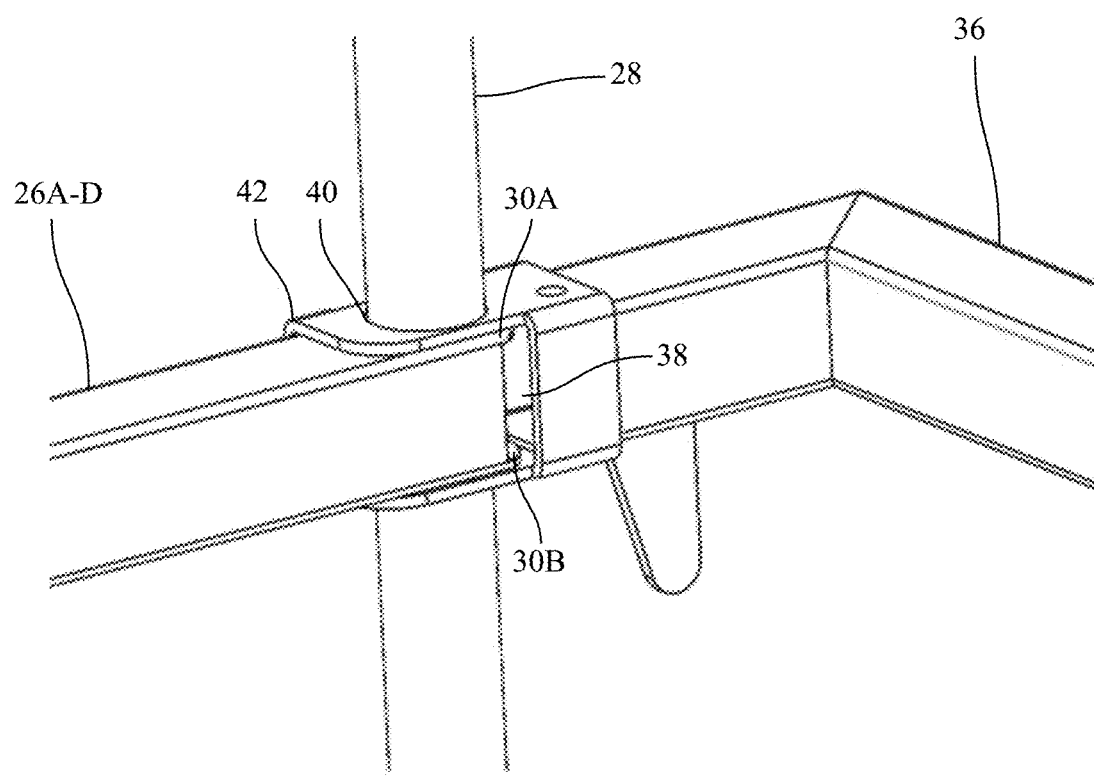
FIG. 4 shows a close-up view of a hinge of a cart according to one embodiment of the present disclosure.

The first end portion 14 further includes at least one hinge member 28 for pivotally securing the first end portion 14 to the side frame portion 12. As shown in FIG. 3, the hinge member 28 may be formed of an elongate bar extending substantially from a bottom of the first end portion 14 to a top of the first end portion 14. When the hinge member 28 is an elongate bar, as shown in FIG. 3, the hinge member 28 may be fixed to the first end portion 14 at ends of the hinge member 28. The hinge member 28 may extend through ends of the one or more horizontal members 26A-26D, as shown in FIG. 4. Ends of the one or more horizontal members 26A-26D may include opposing tabs 30A and 30B. The opposing tabs 30A and 30B may include an aperture formed therethrough such that the hinge member 28 extends through the opposing tabs 30A and 30B of the ends of the horizontal members 26A-26D.

Figure 5:
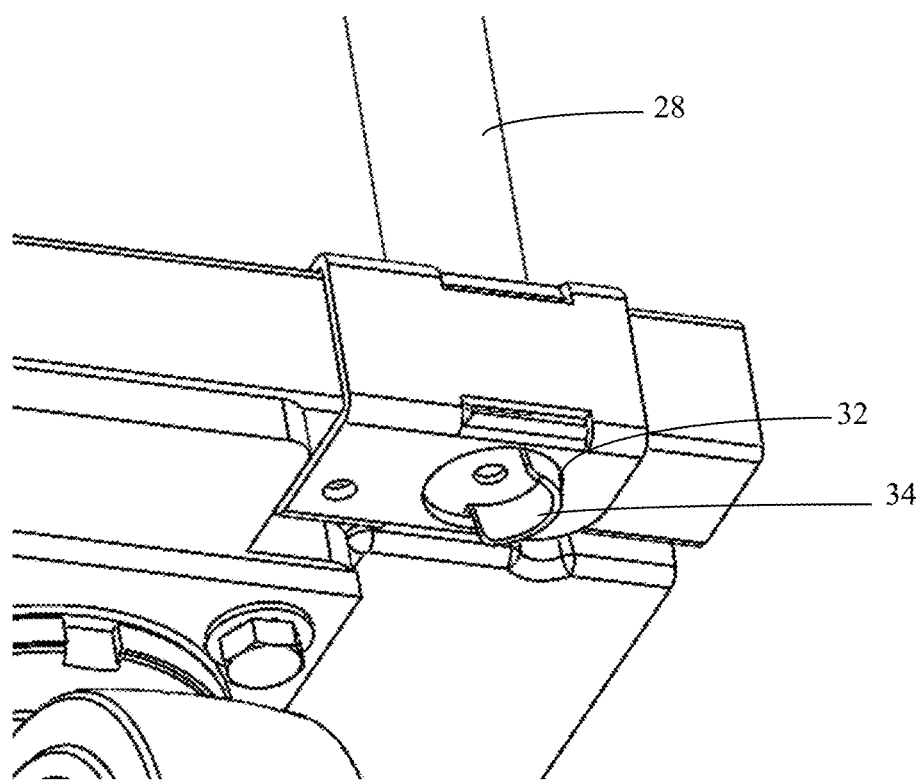
FIG. 5 shows a close-up bottom view of a hinge of a cart according to one embodiment of the present disclosure.

Referring now to FIG. 5, the at least one hinge member 28 may be fixed to the first end portion 14. For example, when the at least one hinge member 28 is an elongate bar, an end of the hinge member 28 may be shaped to fit with at least one of the one or more horizontal members 26A-26D to prevent rotation of the hinge member 28 relative to the first end portion 14. In one example, an end of the hinge member 28 may include one or more projections 32 extending therefrom. The one or more projections 32 may be shaped to fit within one or more corresponding cutouts 34 formed on at least one of the one or more horizontal members 26A-26D, thereby preventing rotation of the hinge member 28 relative to the one or more horizontal members 26A-26D and the first end portion 14.

Referring again to FIG. 1, the first end portion 14 may be pivotally mounted to the side frame portion 12 at one or more L members 36. As shown in FIG. 1, a plurality of L members 36 are located between the first end portion 14 and the side frame portion 12. For example, the one or more L members 36 may be secured on ends of the one or more horizontal members 22A-22D, such as be inserting a portion of the L members 36 into ends of the one or more horizontal members 22A-22D.

Referring to FIG. 4, each of the one or more L members 36 may include a slot 38 formed an end of the L member 36 and shaped to allow the one or more horizontal members 26A-26D to fit through the slot when the first end portion 14 is folded relative to the side frame portion 12 as discussed in greater detail below. The one or more L members 36 further include an aperture 40, which may be aligned with an aperture through the one or more horizontal members 26A-26D such that the hinge member 28 passes through the aperture 40 of the one or more L members 36, as shown in FIG. 4. The one or more L members 36 further include a stop portion 42 for contacting at least a portion of the first end portion 14. For example, when the first end portion 14 includes the one or more horizontal members 26A-26D, the stop portion 42 may contact the one or more horizontal members 26A-26D when the first end portion 14 is unfolded relative to the side frame portion 12.

Figure 6:
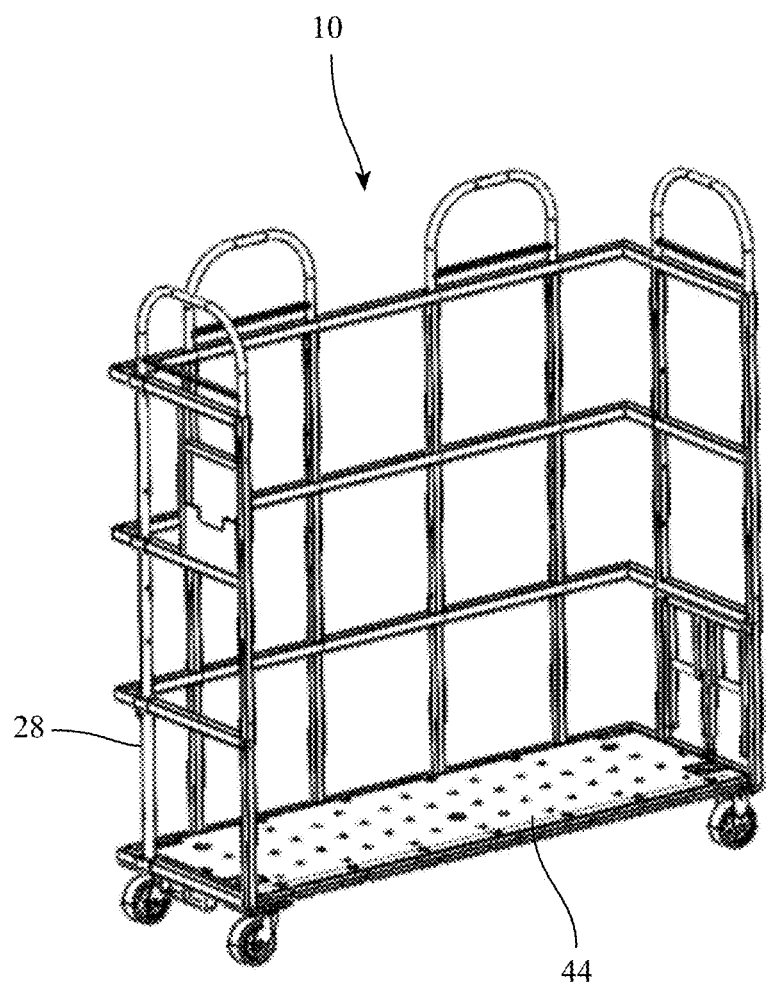
FIG. 6 shows a front perspective view of a cart in an unfolded configuration according to one embodiment of the present disclosure.
Figure 7:
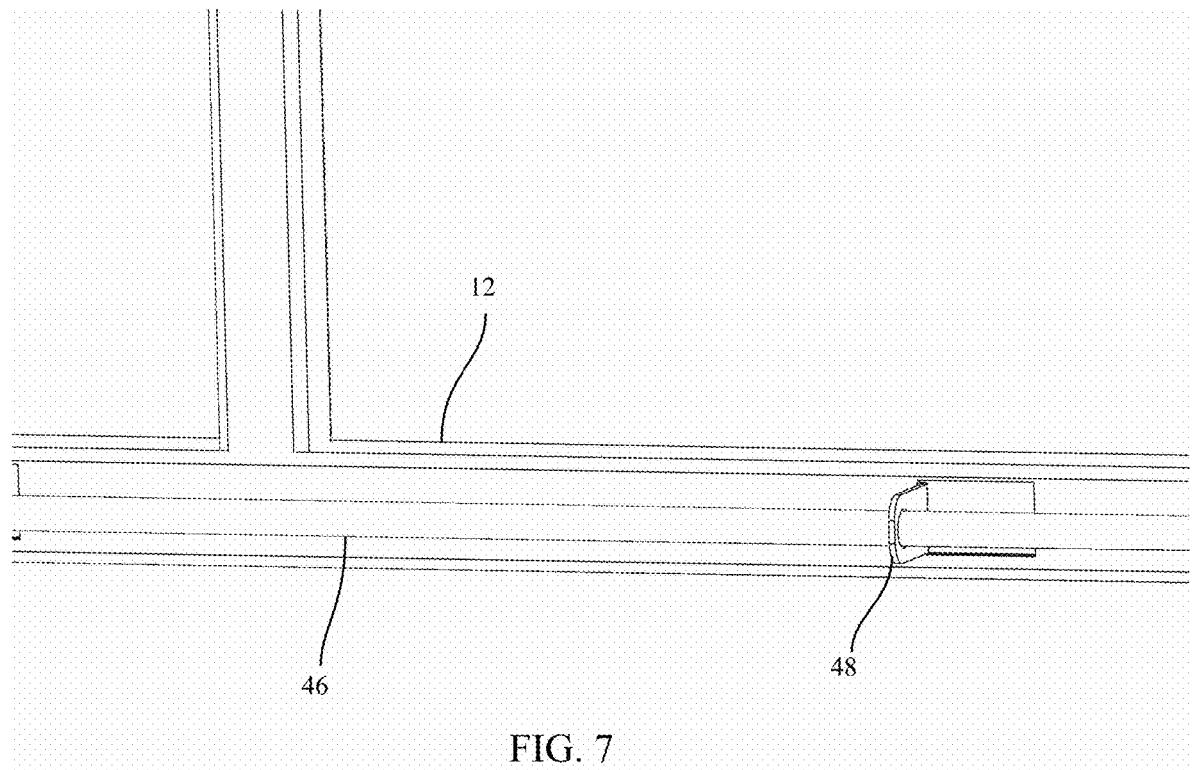
FIG. 7 shows a close-up view of a hinge for a shelf of the cart according to one embodiment of the present disclosure.
Figure 8:
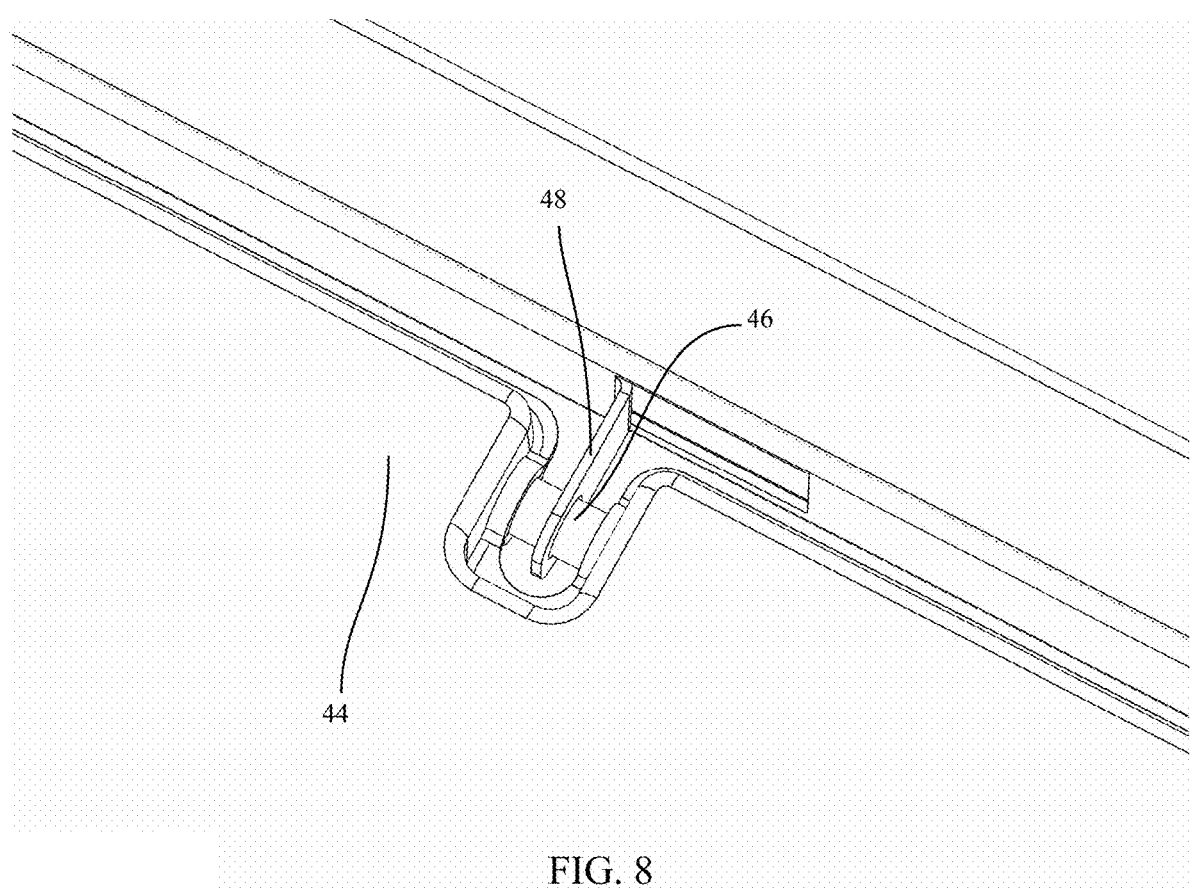
FIG. 8 shows a close-up top view of a hinge for a shelf of the cart according to one embodiment of the present disclosure.

As shown in FIG. 1, the cart 10 further may include at least one shelf 44 that is foldable relative to the cart 10. For example, FIG. 1 shows the at least one shelf 44 in a folded configuration, while FIG. 6 shows the at least one shelf 44 in an unfolded configuration on the cart 10 such that the shelf 44 may support items on the cart 10. The shelf 44 may be formed of a plastic or polymer material. In one embodiment, the shelf 44 is formed from twin sheets of a plastic or polymer material. The shelf 44 may be hingedly secured to the cart 10 to allow the shelf 44 to move between the folded and unfolded configurations. For example, the shelf 44 may be secured to the side frame portion 12 of the cart 10 with a hinge. The hinge may include a hinge pin 46 (FIGS. 7 and 8) extending through one or more mounts 48 located on the side frame portion 12 of the cart 10.

Figure 9:
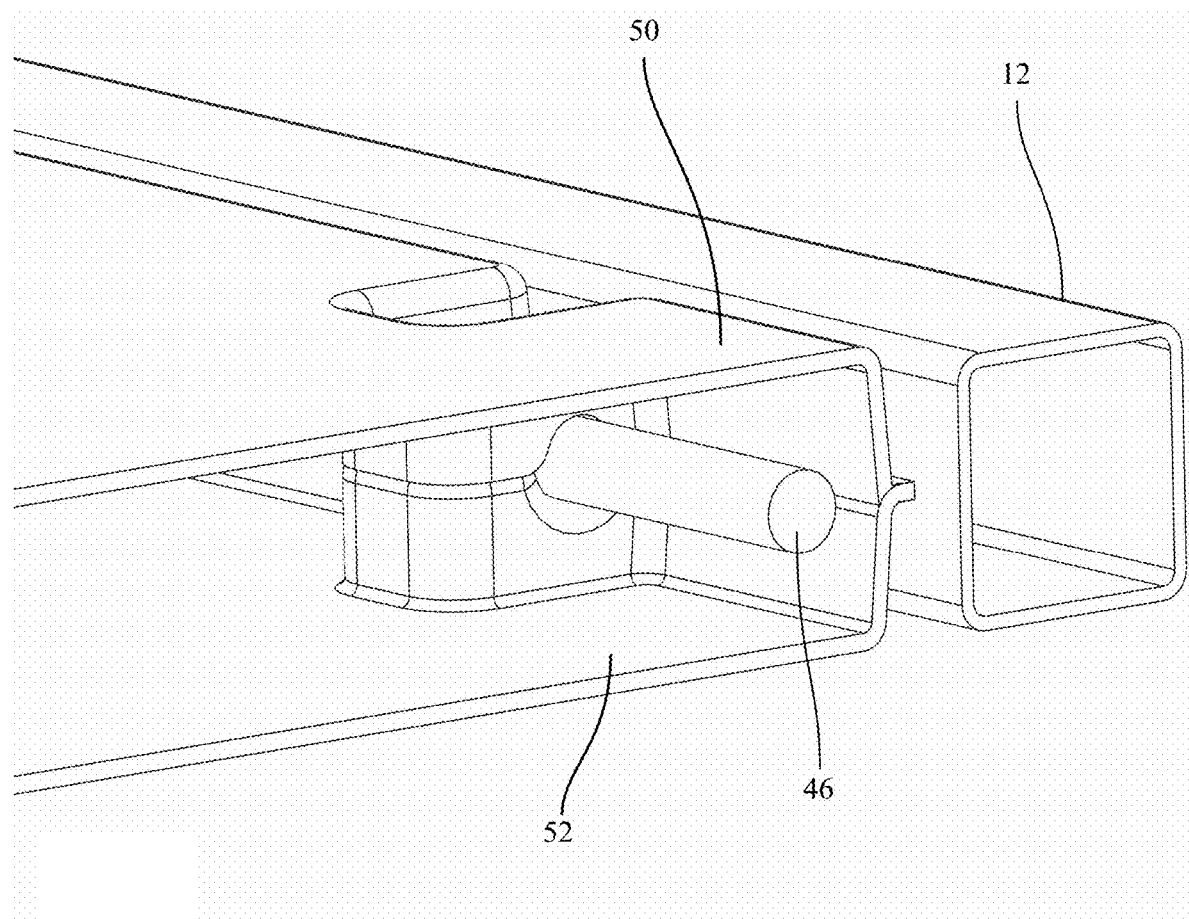
FIG. 9 shows a close-up side view of a hinge for a shelf of the cart according to one embodiment of the present disclosure.

Referring to FIG. 9, in one embodiment the shelf 44 is formed of a first sheet 50 that is joined with a second sheet 52 around the hinge pin 46. The first sheet 50 is joined to the second sheet 52 on opposing sides of the hinge pin 46 such that the hinge pin 46 is secured between the first sheet 50 and the second sheet 52 of the shelf 44. The first sheet 50 and the second sheet 52 may be separately formed or molded and subsequently joined together, such as by bonding the first sheet 50 to the second sheet 52 or securing the first sheet 50 to the second sheet 52 with one or more fasteners.

Figure 14:
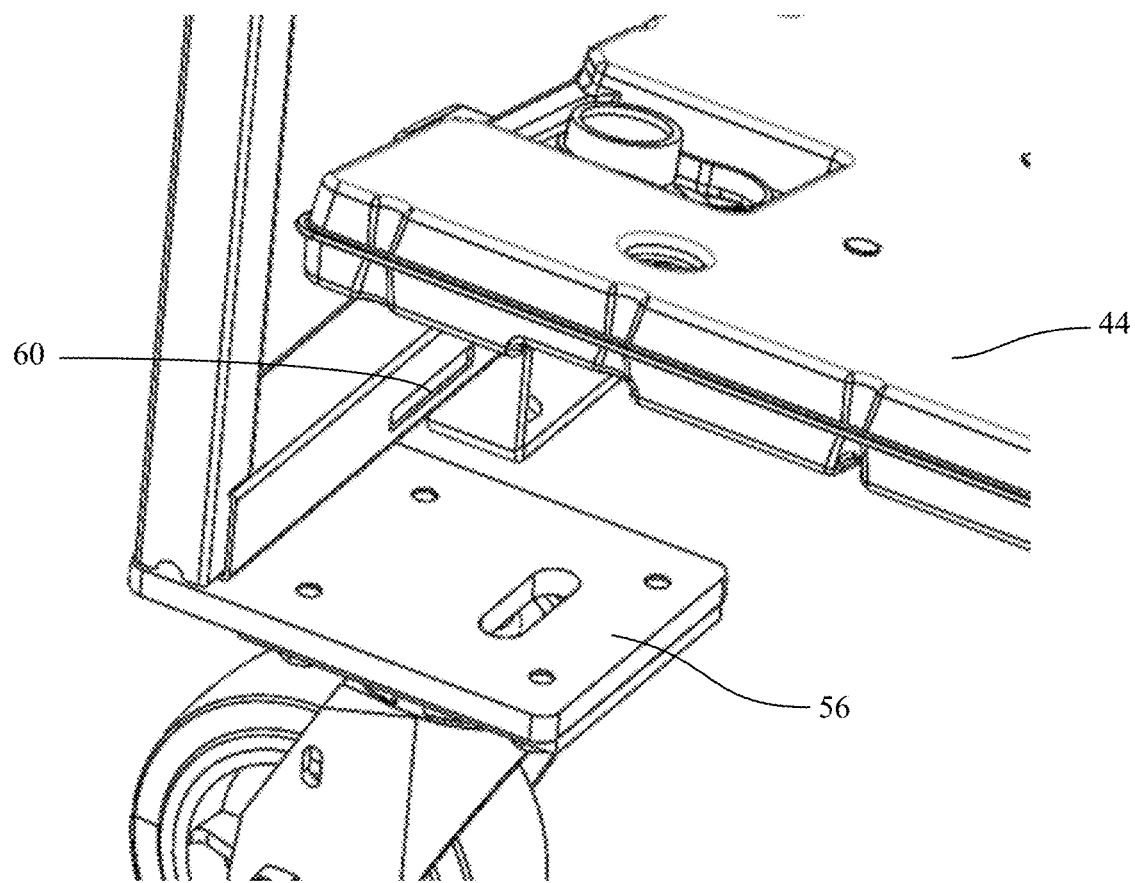
FIG. 14 shows an exploded view of an end portion of a cart according to one embodiment of the present disclosure.

Referring to FIG. 1, the shelf 44 further may include an elongate support member 54 extending substantially across an edge of the shelf 44 that is distal from the hinge. The support member 54 may be secured to an underside of the shelf 44, such as with one or more fasteners. The support member 54 may include one or more pins or other projections protruding downwardly from the support member 54. The support member 54 may be shaped to contact and rest on one or more supports 56 located on the first end portion 14 and the second end portion 16. When the shelf 44 is in an unfolded configuration, the support member 54 may rest on the one or more supports 56 to support the shelf 44 and items placed on the shelf. Referring to FIG. 14, the one or more supports 56 may further include a slot 57 formed therein for receiving at least a portion of the shelf 44 therein such that when the shelf 44 is unfolded, the first end portion 14 and second end portion 16 are prevented from pivoting to a stowed position as discussed in greater detail herein.

Figure 10:
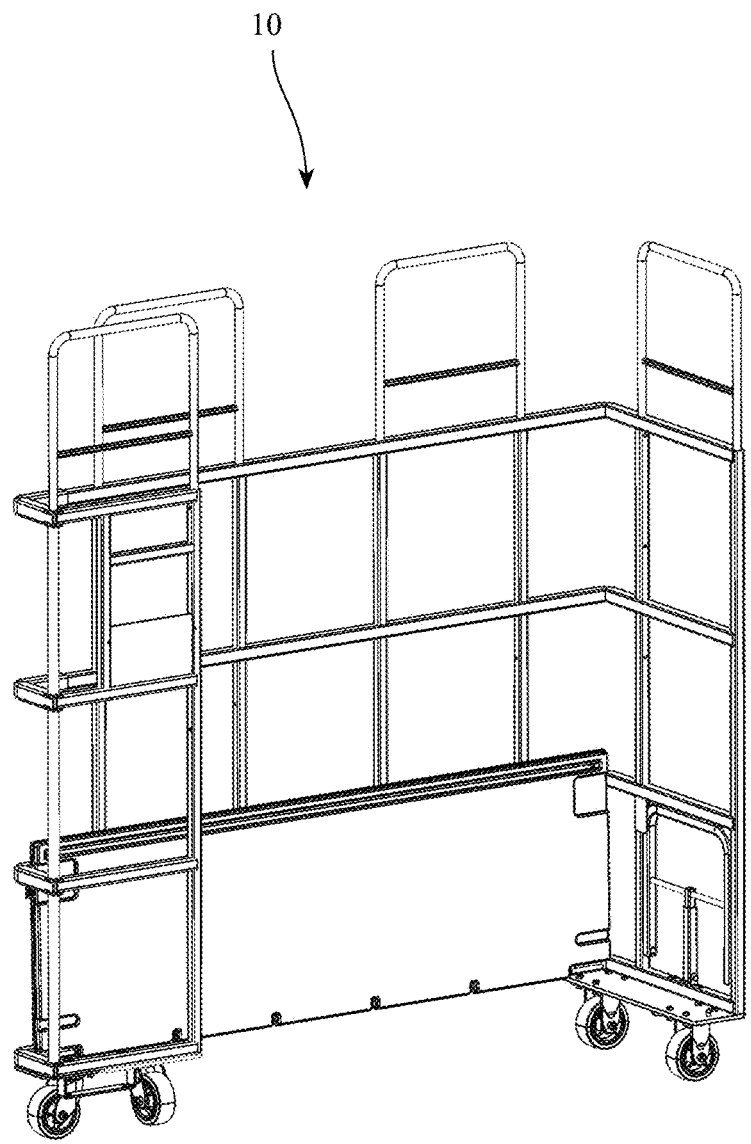
FIG. 10 shows a perspective view of a cart in a folded configuration according to one embodiment of the present disclosure.
Figure 11:
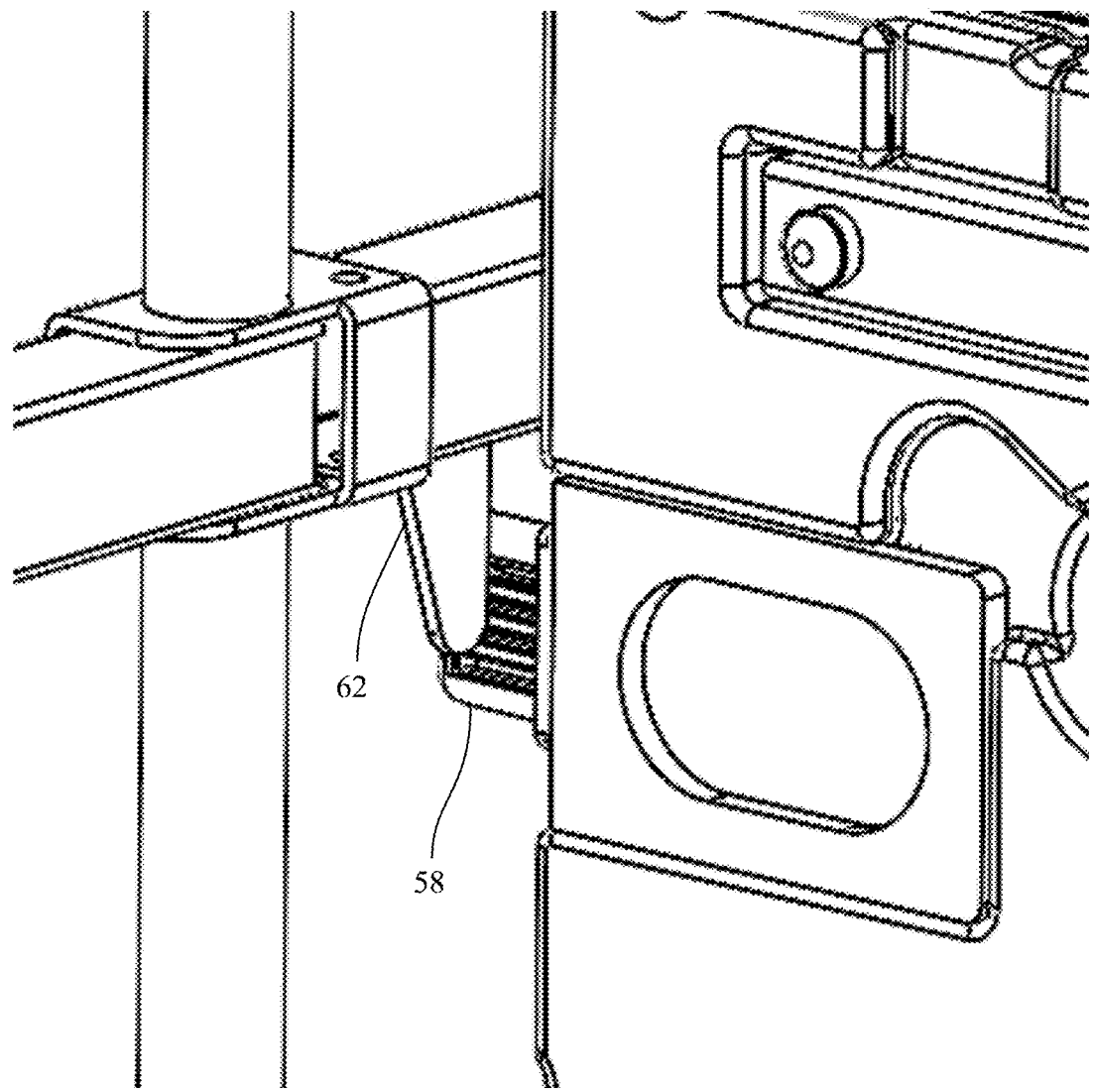
FIG. 11 shows a close-up view of a latch of a shelf according to one embodiment of the present disclosure.

The shelf 44 may optionally include a latch 58 to secure the shelf 44 in the unfolded and folded configurations. For example, the latch 58 may extend from the shelf 44 and be shaped to engage a slot 60 located on the first end portion 14 to secure the shelf 44 in the unfolded configuration. As shown in FIG. 11, when the shelf 44 is folded, the latch 58 may engage a catch 62 to secure the shelf 44 in the folded position shown in FIG. 10.

Figure 12:
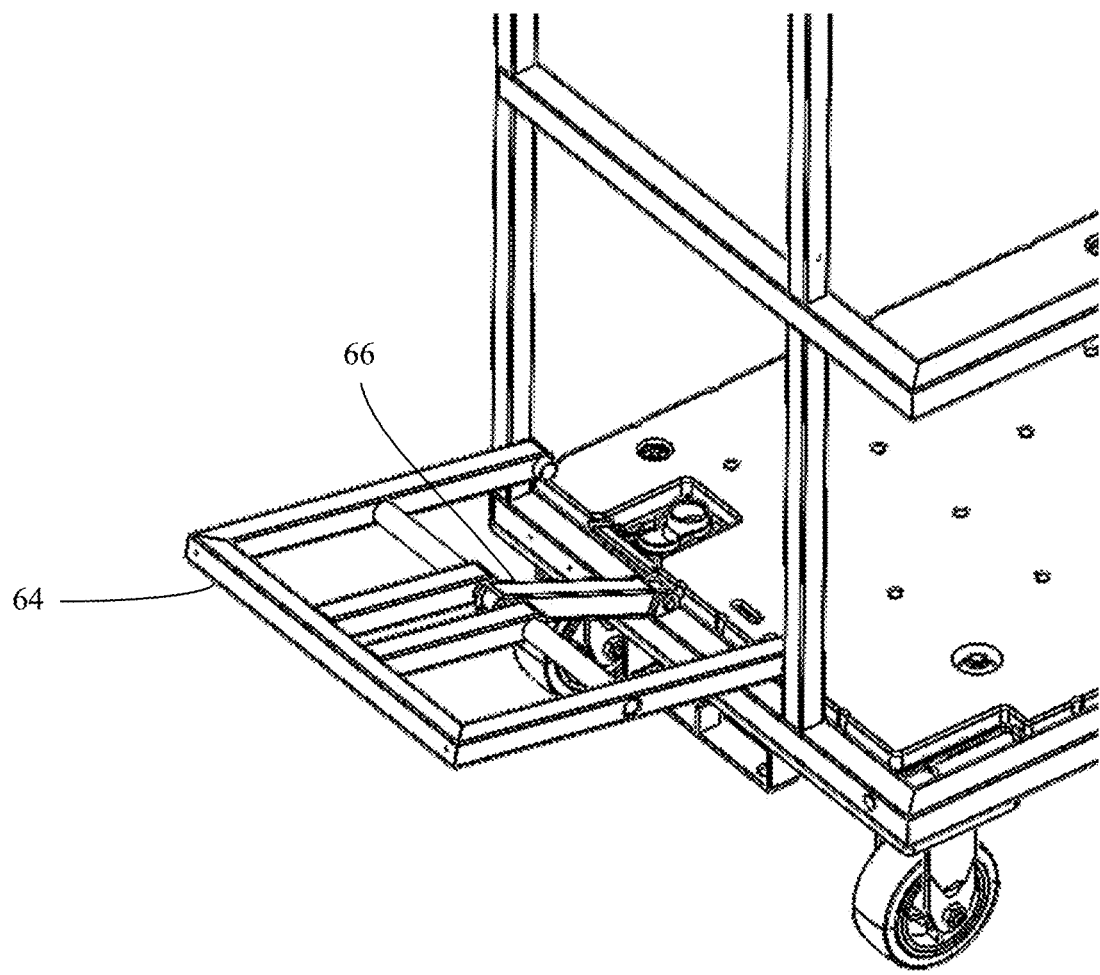
FIG. 12 shows a support located on an end portion of a cart according to one embodiment of the present disclosure.
Figure 13:
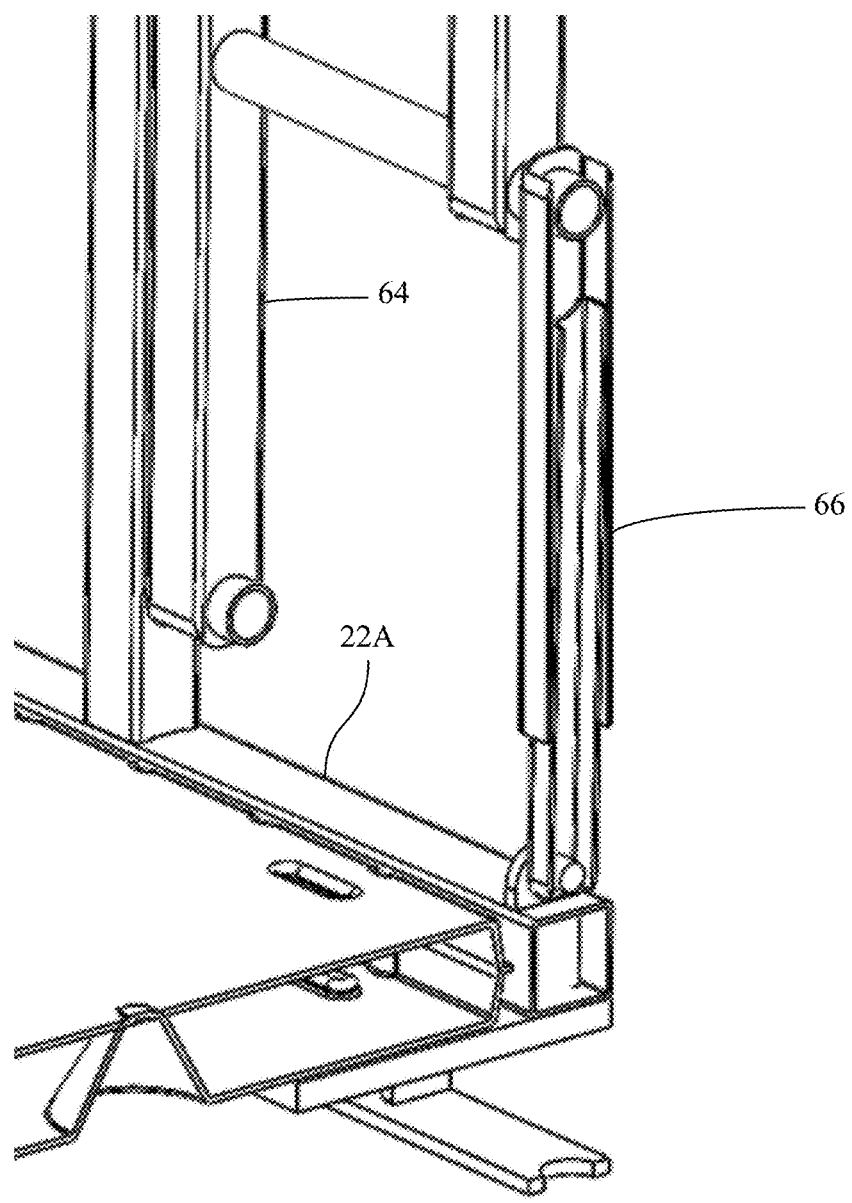
FIG. 13 shows a cross-sectional view of a support according to one embodiment of the present disclosure.

Referring to FIG. 12, the cart 10 may further include a foldable support 64 located on one or both of the first end portion 14 and the second end portion 16. The foldable support 64 may be pivotally mounted on one or both of the first end portion 14 and the second end portion 16 and is movable between a folded position (FIG. 1) and a deployed position (FIG. 12). The foldable support may include a telescopic member 66 (FIG. 13) located between the foldable support 64 and the horizontal member 22A for supporting the foldable support 64 and items placed thereon.

Embodiments of the cart 10 described herein advantageously enable at least a portion of the cart 10 to be folded to reduce a size of the cart 10 without significantly compromising a strength of the cart 10 when unfolded for use. Although reference is made to the first end portion 14 being foldable relative to the side frame portion 12. It is also understood that the second end portion 16 may be fixed or foldable relative to the side frame portion 12.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A cart comprising:
 a side frame portion extending across a width of the cart, wherein the side frame portion includes one or more vertical supports extending upwardly therefrom and two or more horizontal members extending across the side frame portion and supported on the one or more vertical supports;
 a first end portion pivotally mounted on a first end of the side frame portion, wherein the first end portion includes one or more vertical supports extending upwardly therefrom and two or more horizontal members extending across the first end portion and supported on the one or more vertical members;
 a second end portion pivotally mounted on a second end of the side frame portion;
 a shelf movably mounted on one of the side frame portion, first end portion, or second end portion; and a hinge bar, wherein the hinge bar is located through at least a portion of two of the two or more horizontal members of the side frame portion and two of the two or more horizontal members of the first end portion such that the first end portion pivots relative to the side portion about the hinge bar, wherein in an unfolded configuration, the first end portion and the second end portion are unfolded relative to the side frame portion and the shelf is substantially horizontal for locating items thereon; and wherein in a folded configuration, one or both of the first end portion and the second end portion is folded against the side frame portion.

2. The cart of claim 1, wherein
the second end portion further comprises one or more vertical supports extending upwardly therefrom and one or more horizontal members.

3. The cart of claim 1, wherein the shelf is pivotally mounted to the side frame portion and pivots between a folded position and a deployed position.

4. The cart of claim 3, the shelf further comprising a latch for securing the shelf in the folded position and in the deployed position.

5. The cart of claim 1, the first end portion and the second end portion including a support mounted on distal ends thereof, wherein the shelf is supported on the support of the first end portion and the support of the second end portion in an unfolded position.

6. A cart comprising:
a side frame portion extending across a width of the cart, the side frame portion including one or more vertical supports extending upwardly therefrom and two or more horizontal members extending across the side frame portion and supported on the one or more vertical supports;

a first end portion pivotally mounted on a first end of the side frame portion, the first end portion including one or more vertical supports extending upwardly therefrom and two or more horizontal members supported on the one or more vertical supports;

a second end portion pivotally mounted on a second end of the side frame portion, the second end portion including one or more vertical supports extending upwardly therefrom and one or more horizontal members supported on the one or more vertical supports;

a shelf pivotally mounted on the side frame portion; and a hinge bar, wherein the hinge bar is located through at least a portion of two of the two or more horizontal members of the side frame portion and two of the two or more horizontal members of the first end portion such that the first end portion pivots relative to the side portion about the hinge bar, wherein in an unfolded configuration, the first end portion and the second end portion are unfolded relative to the side frame portion and the shelf is substantially horizontal for locating items thereon; and wherein in a folded configuration, one or both of the first end portion and the second end portion is folded against the side frame portion.

* * * * *